(12) United States Patent
Muramatsu et al.

(10) Patent No.: US 6,513,213 B1
(45) Date of Patent: Feb. 4, 2003

(54) METHOD OF PRODUCING A MICROGRIPPER

(75) Inventors: Naoki Muramatsu, Tokyo (JP); Tomoyosi Tada, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 106 days.

(21) Appl. No.: 09/684,635

(22) Filed: Oct. 10, 2000

Related U.S. Application Data

(63) Continuation of application No. PCT/JP99/00520, filed on Feb. 8, 1999.

(51) Int. Cl.[7] .............................................. H04R 17/00
(52) U.S. Cl. ........................ 29/25.35; 29/740; 29/741; 29/739; 29/751; 29/752; 29/753; 29/754; 29/758; 29/760; 294/100; 294/88; 901/38; 901/39
(58) Field of Search ......................... 29/740, 741, 739, 29/751, 752, 753, 754, 758, 760; 294/100, 88; 901/38, 39

(56) References Cited

U.S. PATENT DOCUMENTS

| | | | | |
|---|---|---|---|---|
| 3,904,234 A | * | 9/1975 | Hill et al. .................. | 294/106 |
| 4,188,166 A | * | 2/1980 | Moreau et al. ............. | 414/735 |
| 4,234,223 A | * | 11/1980 | O'Neil ....................... | 294/88 |
| 4,666,198 A | * | 5/1987 | Heiserman ................. | 901/36 |
| 5,046,773 A | * | 9/1991 | Modesitt .................... | 294/100 |
| 5,332,275 A | * | 7/1994 | Conway et al. ............ | 294/100 |
| 5,538,305 A | * | 7/1996 | Conway et al. ............ | 901/36 |
| 5,657,534 A | * | 8/1997 | Yi .............................. | 29/743 |
| 5,687,613 A | * | 11/1997 | Swedberg ................... | 29/753 |
| 5,895,084 A | * | 4/1999 | Mauro ....................... | 294/100 |
| 6,244,643 B1 | * | 6/2001 | Tillaart ...................... | 294/88 |

FOREIGN PATENT DOCUMENTS

| | | | |
|---|---|---|---|
| JP | 5-346105 | 12/1993 | ......... F15B/15/14 |
| JP | 8-90477 | 4/1996 | ......... B25J/15/08 |
| JP | 8-168979 | 7/1996 | ......... B25J/7/00 |

OTHER PUBLICATIONS

96-DETC/DAC—1497, Proceedings of the 1996 ASME Design Engineering Technical Conference Patent abstract of Japan Hei. 8-90477.
International Search Report.

* cited by examiner

*Primary Examiner*—Peter Vo
*Assistant Examiner*—Tai Nguyen
(74) *Attorney, Agent, or Firm*—Sughrue Mion, PLLC

(57) ABSTRACT

In a method of producing a microgripper including a grip finger 100 which has a coupling portion 100g that commonly owns one ends of three V-shaped edges 100v on an open end side, other ends of the V-shaped edges 100v being connected to a case 14, and in which the coupling portion 100g is connected to a moving portion of a translational driving section 12, and the coupling portion 100g is pulled on the basis of translational movement, whereby displacement amounts of the tip ends of the V-shaped edges 100v are inwardly magnified more than an amount of the translational movement, the method comprises the steps of: in a state where the grip finger 100 has three edge portions 101a in which the V-shaped edges 100v having the coupling portion 100g are developed in a substantially flat plane, outwardly bending the edge portions 101a at a substantially center; and inwardly bending the edge portions 101a at a vicinity of the coupling portion 100g.

6 Claims, 6 Drawing Sheets

1

METHOD OF PRODUCING A MICROGRIPPER

This application is a continuation of PCT/JP99/00520 filed Feb. 8, 1999.

TECHNICAL FIELD

The present invention relates to an improvement of a method of producing a microgripper which is used in transportation and an assembling work of a minute part, or a so-called microassembly work.

BACKGROUND ART

Although there are many microgrippers (hereinafter, referred to as grippers) which are in the research and development stage, grippers which have been commercialized are very small in number. This seems to be affected by the difficulty of micronization of a gripper actuator itself. Under such circumstances, as a conventional art of an actuator showing a fundamental configuration of a product, known is JP-A-8-90477.

Such an actuator is characterized in a driving mechanism in which expansion and contraction displacement of a movable frame due to a piezoelectric element is transformed into opening and closing displacement of U-like gripping fingers via a swinging mechanism configured by a hinge and levers, and has an effect that the gripping fingers exert uniform opening and closing behavior on an object to be gripped.

In the gripper of the conventional art, however, a displacement magnifying mechanism is required in order to use expansion and contraction displacement of the piezoelectric element as operation displacement of the gripper, and hence the structure is complicated. For example, expansion and contraction displacement of a piezoelectric element is on the order of nm. Therefore, there is a problem in that, in order to obtain even opening and closing displacement of only about several hundreds of $\mu$m the gripping fingers, a magnifying mechanism of several hundreds of times is necessary.

The inventor of the present invention has proposed a gripper comprising a displacement magnifying member in which the displacement amount of a tip end portion is made large without using a magnifying mechanism on the basis of slight translational displacement of a driving section, and which is configured by two V-shaped edges for gripping an object to be gripped (International Application No. PCT/JP97/0461).

In order to produce a gripper comprising a displacement magnifying member which has plural V-shaped edges, it may be usually contemplated that plural V-shaped edges which have been independently worked are prepared and then joined to one another. However, there is a problem in that the working accuracy is hardly ensured and the assembly is cumbersome.

DISCLOSURE OF INVENTION

The invention has been conducted in order to solve the problem. It is an object of the invention to provide a method of producing a microgripper which comprises a displacement magnifying member (gripping member) for gripping a minute part or the like.

In order to attain the object, the method of producing a microgripper of a first aspect is a method of producing a microgripper including: a translational driving section having a moving portion which is housed in a case, and which is translationally moved; and a displacement magnifying member which comprises at least two V-shaped edges having a substantially V-like shape, which has a coupling portion that commonly owns one ends of the V-shaped edges on an open end side, other ends of the V-shaped edges being connected to the case, and in which the coupling portion is connected to the moving portion of the translational driving section, and the coupling portion is pulled on the basis of translational movement, whereby displacement amounts of the tip ends of the V-shaped edges are inwardly magnified more than an amount of the translational movement, characterized in that the method comprises the steps of: in a state where the displacement magnifying member has at least two edge portions in which the V-shaped edges having the coupling portion are developed in a substantially flat plane, outwardly bending the edge portions at a substantially center; and inwardly bending the edge portions at a vicinity of the coupling portion.

The method of producing a microgripper of a second aspect is characterized in that the method comprises a step of outwardly bending the other ends of the V-shaped edges consisting of the displacement magnifying member, so as to be connected to the case, thereby obtaining a fixing piece.

The method of producing a microgripper of a third aspect is characterized in that the edge portions have an identification portion for visually recognizing a place to be bent.

The method of producing a microgripper of a fourth aspect is characterized in that the coupling portion of the displacement magnifying member has a doughnut-like shape, and boundary portions between the coupling portion and the edge portions are smaller in width than the edge portions.

The method of producing a microgripper of a fifth aspect is characterized in that the microgripper has a ring member which is fixed to the case, and the fixing piece is engagingly fixed to a cutaway formed in an inner side of the ring member.

BEST MODE FOR CARRYING OUT THE INVENTION

Next, with respect to the invention, an embodiment will be described.

Embodiment 1

Figure 1:
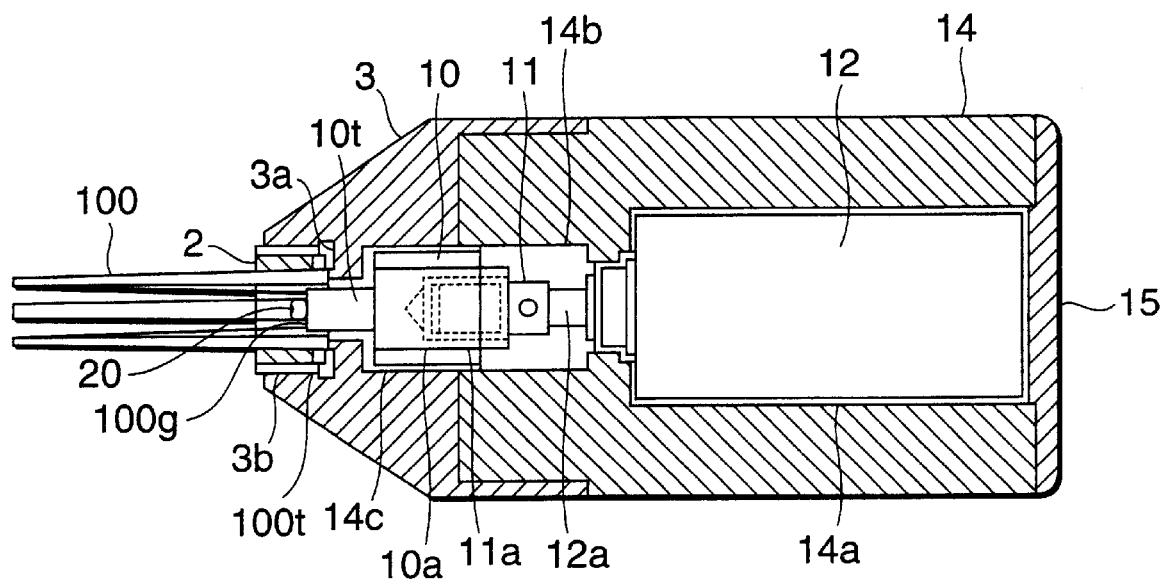
FIG. 1 is a sectional side view showing the whole of a microgripper of an embodiment of the invention.
Figure 2:
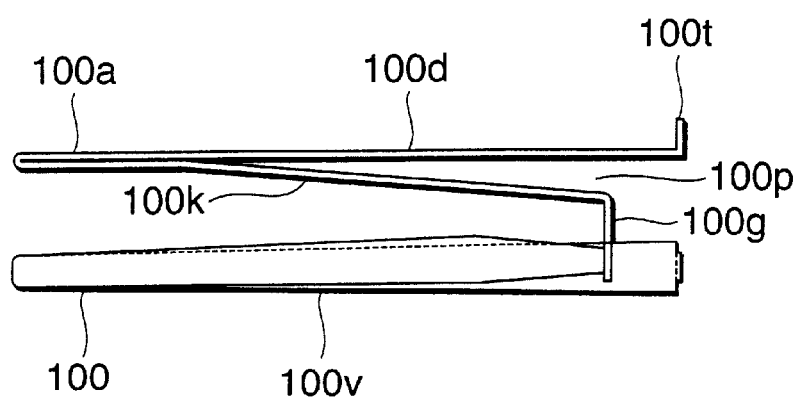
FIG. 2 is a front view showing a grip finger used in the microgripper of FIG. 1.

An embodiment of the invention will be described with reference to FIGS. 1 to 3. Referring to FIGS. 1 and 2, a microgripper consists of: a grip finger 100 serving as the displacement magnifying member in which, in order to grip a minute object, one end 100g is pulled or returned on the basis of translational displacement to magnifyingly displace a tip end portion, thereby causing the grip finger to perform a closing or opening operation, and which has three V-shaped edges having a substantially V-like shape; a driving section which is rotated to give a driving force to the grip finger 100; a transforming section which transforms the rotation of the driving section into translational movement; a coupling portion which couples the transforming section with the grip finger 100; a case section which accommodates the transforming section, the driving section, and the coupling portion; and a fixing section which fixes a part of the grip finger 100 by using the case section.

As shown in FIG. 2, the grip finger 100 has three V-shaped edges 100V having a substantially V-like shape. In a tip end portion of each of the V-shaped edges, a common portion 100a which commonly owns ends is disposed. The V-shaped edge 100V is a beam-like elastic member, elongates from the common portion 100a, and has: two opposed edge portions 100d and 100k, an opening portion 100p which is opened in the side opposite to the common portion 100a; a coupling portion 100g which has a doughnut-like shape, and which couples one ends of the opening portions (sides) 100p to one another; and a hook-like fixing claw (fixing piece) 100t. In the grip finger 100, an object is gripped by inwardly bending the three common portions (tip end portions) 100a, and the object is released by returning the three common portions 100a.

In the common portions 100a, a bonding portion is formed in which the edge portions 100d and 100k are bonded to each other by soldering, welding, an adhesive agent, or the like. The material of the grip finger 100 is not limited to a metal, and may be a non-metallic material such as a resin depending on an object. The coupling portion 100g is not required to have a doughnut-like shape as described above, as far as the end portions of the edge portions 100k are coupled to one another.

The driving section is, for example, a coreless DC motor (hereinafter, referred to as a motor) 12 having a reduction gear and a rotor shaft 12a which is connected to the coupling portion 100g of the grip finger 100 via the transforming section, and which is used for translationally moving the coupling portion 100g.

The transforming section consists of: a screw shaft 11 which has a screw 11a in an outer periphery, and to which the rotor shaft 12a of the motor 12 is fittingly fixed; and a nut 10 which has a screw 10a in a circumferential face of a hollow portion formed by cutting away the rear end, and in which the screw 10a is screwed with the screw 11a of the screw shaft 11, and is configured so that the rotation of the rotor shaft 12a of the motor 12 is transformed into translational displacement of the nut 10.

With respect to the coupling portion, a projection 10t is formed at the tip end of the nut 10, a screw hole is opened in a center portion of the projection 10t, and the coupling portion 100g of the grip finger 100 is fixed to the screw hole by a screw 20. The nut 10 is formed into an oval or rectangular section shape.

The case section is formed by a case 14, a lid 15 which closes the right end face of the case 14, and a cap 3 which is fittingly fixed to the left end face of the case 14. The case 14 has: a motor accommodating portion 14a which is formed into a cylindrical shape, and which houses the motor 12 in a column-like space; a screw shaft accommodating portion 14b which accommodates the rotor shaft 12a of the motor 12, and a part of the screw shaft 11; and a nut accommodating portion 14c which accommodates the nut 10, which is formed as a whole into an oval or rectangular shape, and which serves as a guiding portion.

The cap 3 has a hollow cylinder which incorporates the coupling portion and has a cylindrical form having a transverse section of a substantially trapezoidal shape, and in which a through hole of three steps are formed at the center. An end face of the hollow cylinder is recessed to form a flange 3a, and a screw 3b is formed in the circumferential face of the recess.

In the fixing portion, the fixing claws 100t of the grip finger 100 abut against the flange 3a of the cap 3, a screw formed in the outer circumferential face of a cylindrical presser 2 is screwed with the screw 3b of the recess of the cap 3, thereby fixing the fixing claws 100t of the grip finger 100 to the cap 3.

A method of producing the grip finger 100 will be described with reference to FIGS. 3 to 6. FIG. 3 is a plan view showing a finger piece. A substantially Y-like finger piece 101 is cut out from a single elastic plate made of a metal material having spring characteristics, by, for example, a wire electrical discharge machine. In other words, it is characterized in that the grip finger 100 is produced from the state where the finger piece 101 is developed, and without preparing plural independent V-shaped edges and then joining the V-shaped edges together.

Figure 3:
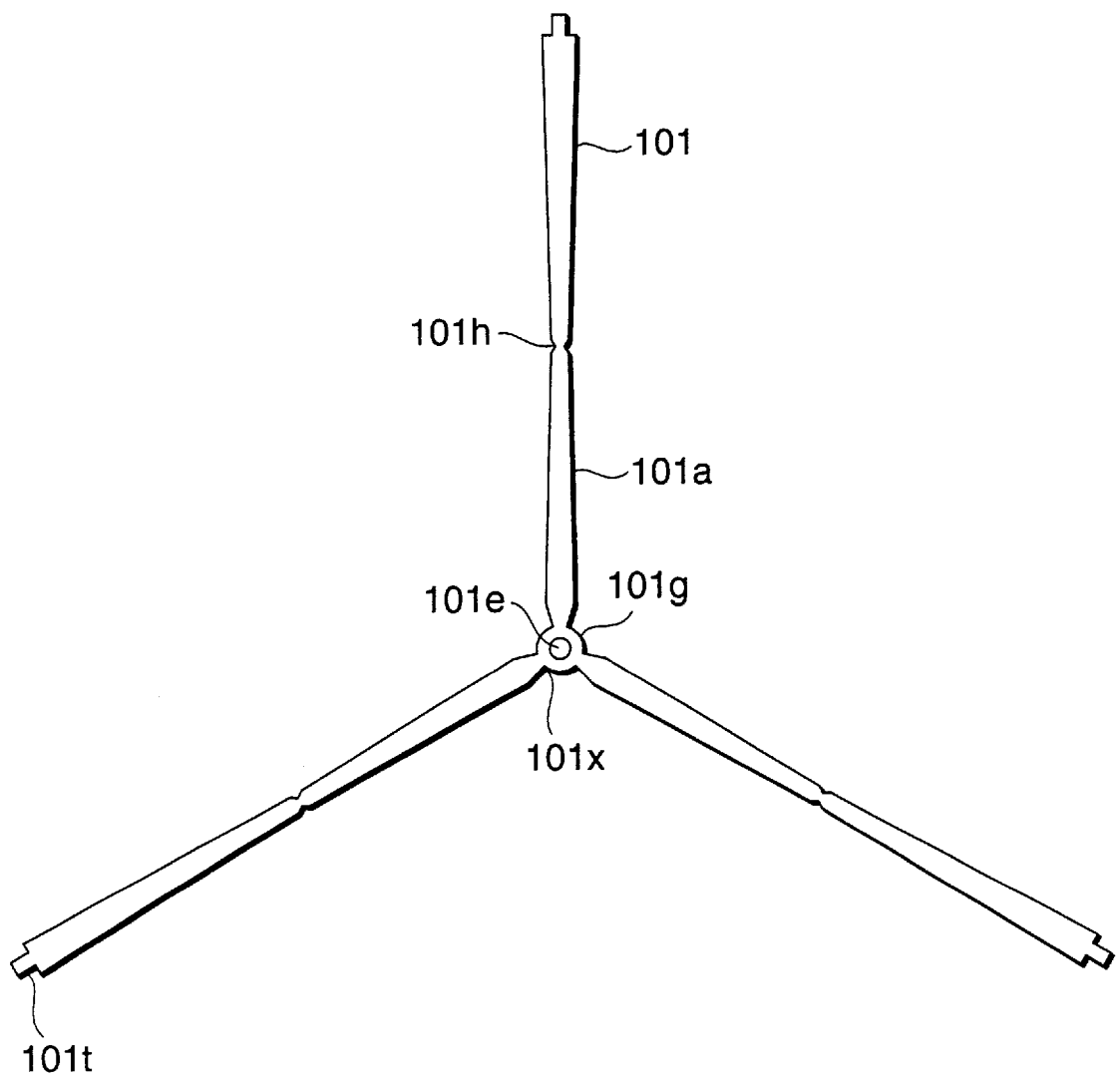
FIG. 3 is a plan view showing a finger piece which is obtained by developing the grip finger of FIG. 2.

Referring to FIG. 3, in the finger piece 101, three edge portions 101a having the same length are radiately formed at regular intervals and with being centered at a center coupling portion 101g. The coupling portion 101g is formed into a doughnut-like shape, and a hole 101e is opened at the center. Boundary portions 101x between the coupling portion 101g and the edge portions 101a are smaller in width than the edge portions. In a middle area of each of the edge portions 101a, a notch 101h serving as an identification portion for visually recognizing a place where the edge portion 101a is to be bent is formed. In the other end portion, a fixing claw 101t which is smaller in width than the edge portion 101 is disposed. Although the example in which the three edge portions 101a have the same shape and are formed at regular intervals is described, the edge portions may have different shapes and formed at irregular intervals.

Figure 4:
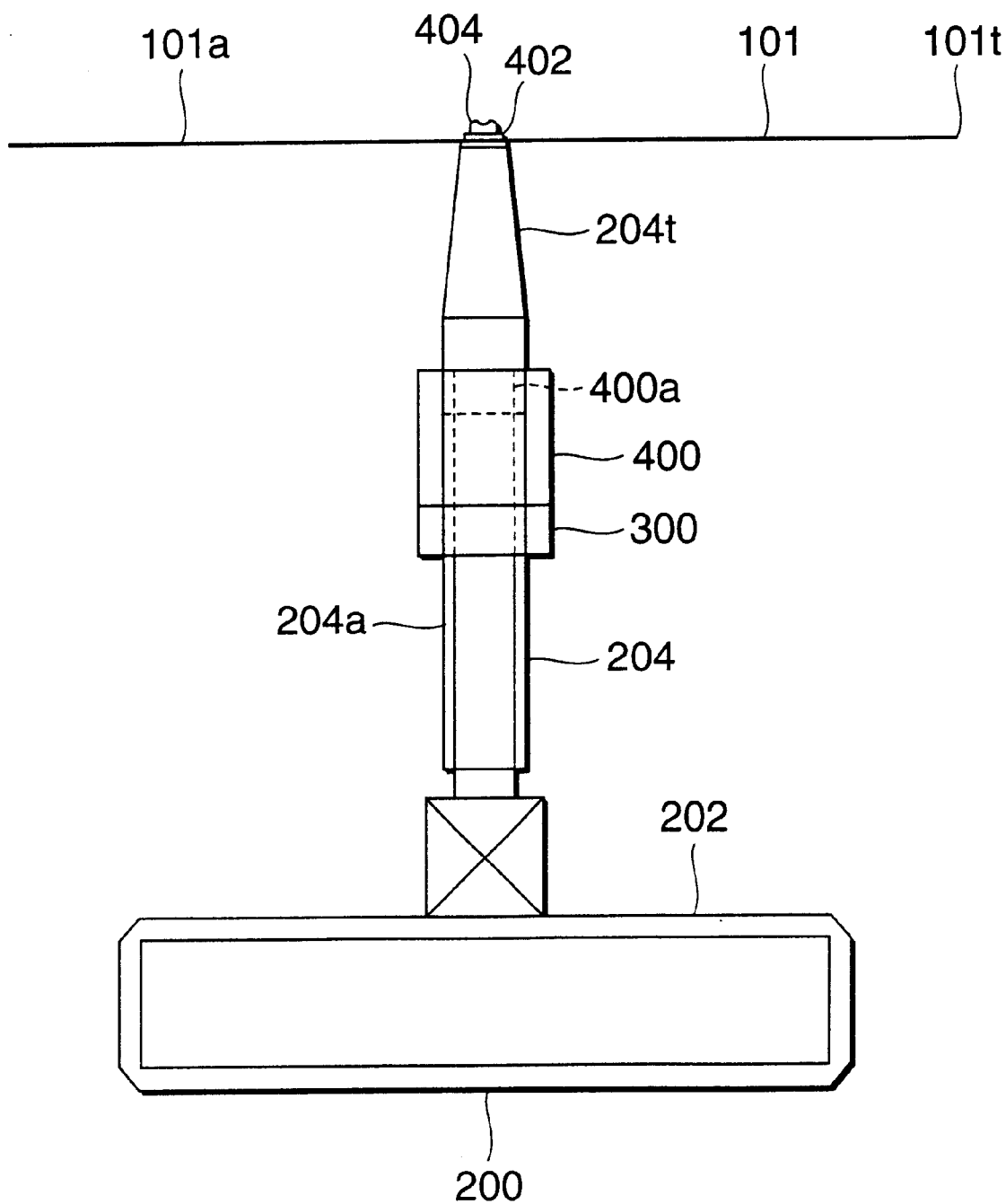
FIG. 4 is a front view showing a state. where the finger piece of FIG. 3 is attached to a jig in order to work them into the grip finger.

Next, as shown in FIG. 4, a support jig 200 having a pedestal 202 having a square column-like shape, and a pole portion 204 having a column-like shape is prepared, a screw nut 300 is screwed with a screw 204a of the pole portion 204, and a screw portion 400a of a positioning nut 400 which has a cavity portion 400c in an upper portion is screwed in the same manner and stopped at a predetermined position. The finger piece 101 is kept to be horizontal, a screw hole 204 disposed in the upper face of the pole portion 204 of the support jig 200 is made coincident with the hole 101e of the finger piece 101, and the finger piece 101 is fixed via a washer 402 by a P round head screw 404.

Figure 5:
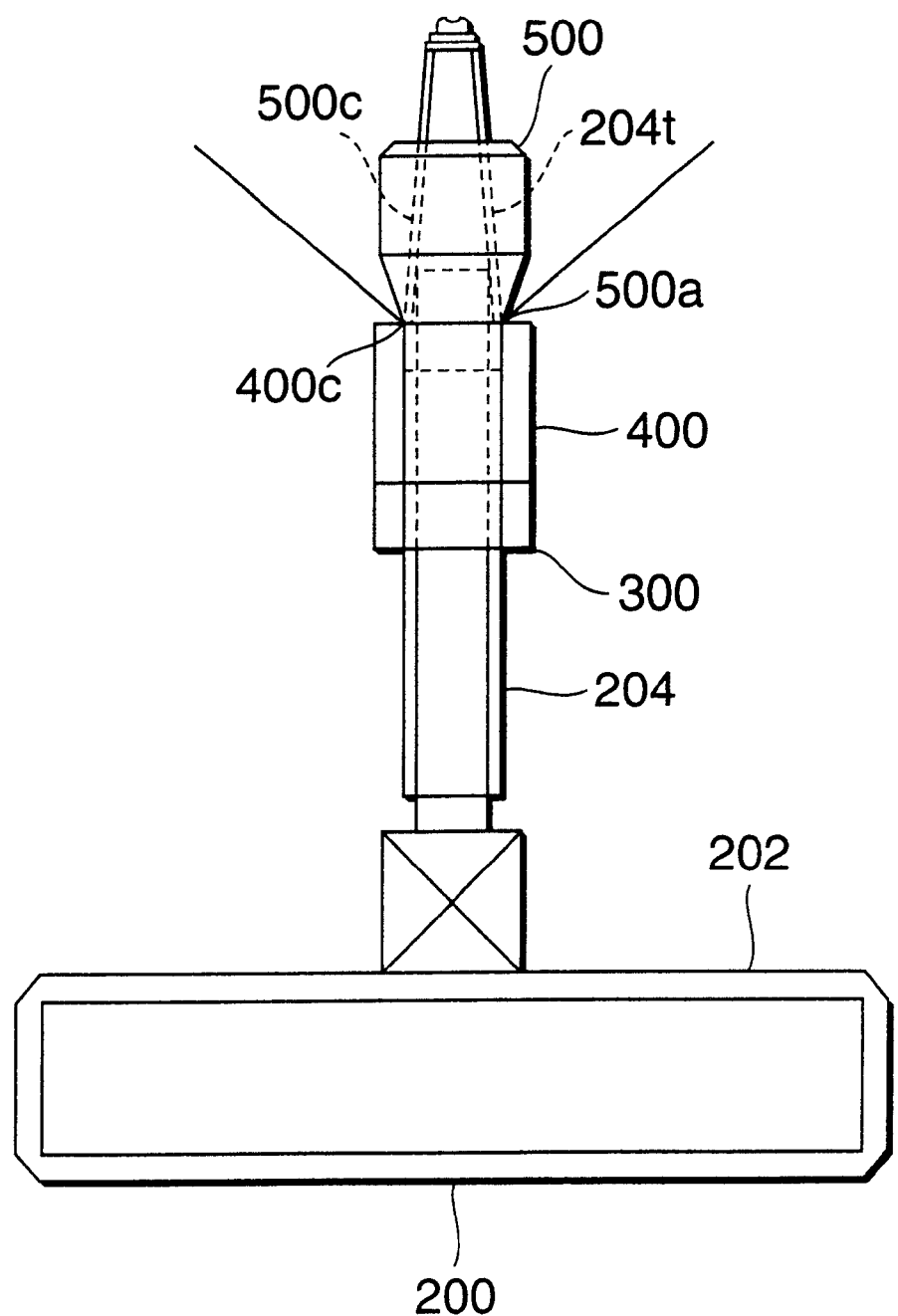
FIG. 5 is a front view showing a step of bending the finger piece of FIG. 4 by the jig.
Figure 6:
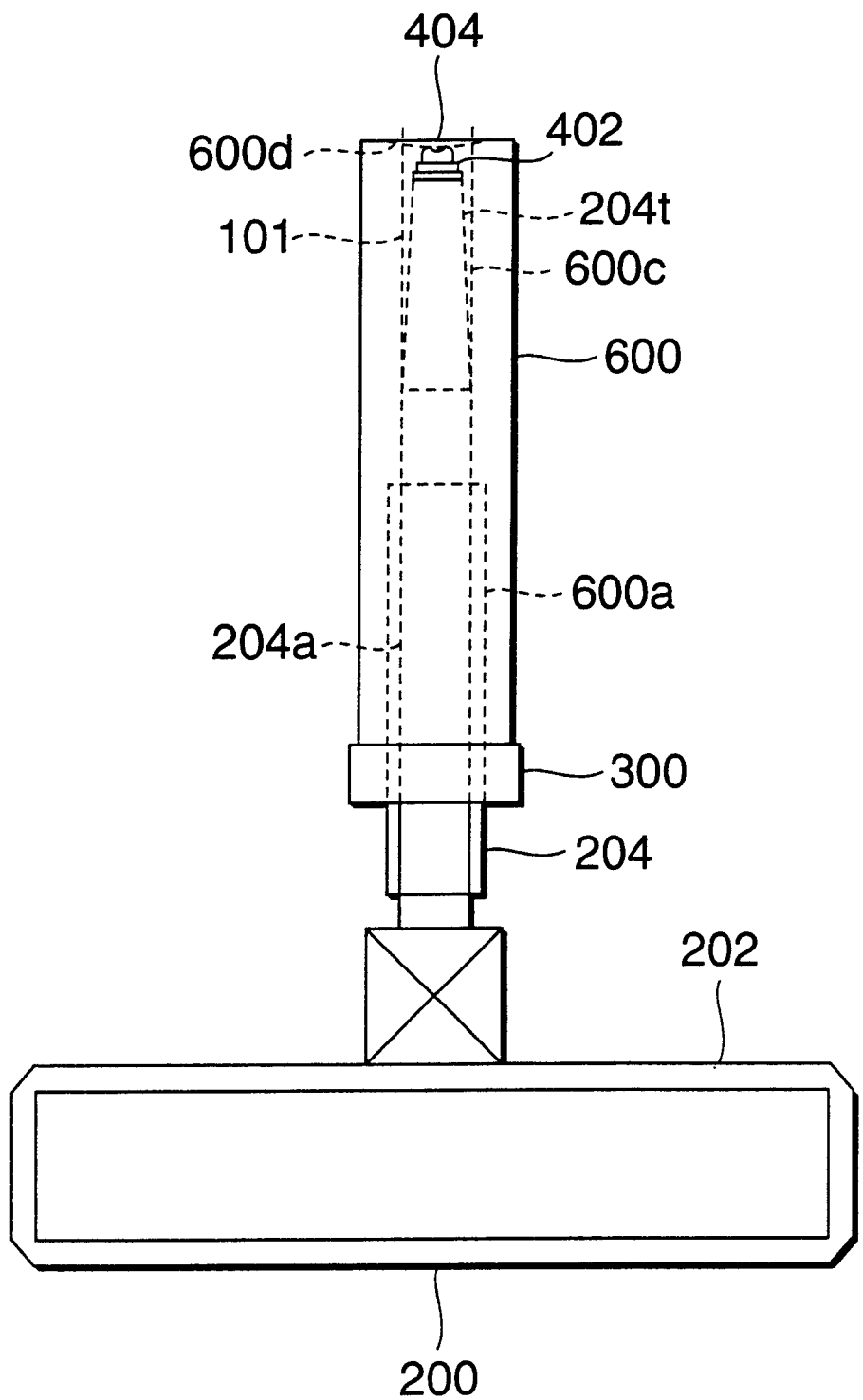
FIG. 6 is a front view showing a state where the finger piece of FIG. 5 is bent by the jig.

As shown in FIG. 5, when a cavity portion 500c of a bending jig 500 is gradually inserted onto a tapered is portion 204t formed on the pole portion 204 of the support jig 200, the finger piece 101 is bent from the boundary portions 101x along the tapered portion 204t. Then, the three edge portions 101a of the finger piece 101 are bent along the tapered portion 204t. When the bending jig 500 is further lowered, a lower end portion 500a of the bending jig 500 gradually enters the column-like cavity portion 400c of the nut 400 because the lower end portion 500a of the bending jig 500 is formed so as to have a diameter which is slightly smaller than the cavity portion 400c of the nut 400. The three notches 101h of the finger piece 100 are visually recognized, and the outer sides with respect to the center end portion are bent backward at the notches 101h. The notches 101h have a function of facilitating the bending of the edge portions 101a, in addition to the function of serving as identification portions.

The bending jig 500 is detached from the pole portion 204 of the support jig 200, the P round head screw 404 and the washer 402 are removed away, and also the finger piece 101 is detached from the pole portion 204 of the support jig 200. The finger piece 101 in which each of the edge portions 101a is bent at the position of the corresponding notch 101h is further bent by pliers or the like until the bent edge portion 101a intersects with the original edge portion 101a. In this case, the bending is performed until intersection occurs, because the finger piece 101 is an elastic member and the finger piece must be therefore bent at a degree which is slightly larger than that corresponding to the final shape of the grip finger 100.

A screw portion 600a of a cylindrical setting jig 600 is screwed with the screw 204a of the pole portion 204 of the support jig 200, and the setting jig 600 is fixed by the screw nut 300 so as to be located at a predetermined position. Thereafter, the bent finger piece 101 is inserted into a gap between a cavity portion 600c of the setting jig 600 and the tapered portion 204t of the support jig 200, and the hole 101e of the finger piece 101 is fixed via the washer 402 by the P round head screw 404 to the ceiling face of the pole portion 204.

The three tip end portions 101t of the finger piece 101 protrude from the upper face of the setting jig 600, and the protruding portions 101t are bent along a column-like countersunk portion 600d of the setting jig 600. The grip finger is perpendicularly bent along the inner side where the countersunk portion 600d is formed into a substantially true circular shape, so that the grip finger 100 having the claws 100t is produced. The screwing between the screw portion 600a of the setting jig 600 and the screw 204a of the pole portion 204 is cancelled, and the setting jig 600 and the finger piece 101 are detached from the pole portion 204 of the support jig 200. The detached finger piece 101 is worked into the grip finger 100 as shown in FIG. 2. The three fixing claws 101t of the grip finger 100 abut against the flange 3a of the cap 3, and are fixed to the cap 3 by the cylindrical presser 2. The coupling portion 100g of the grip finger 100 is fixed to the projection 10t of the nut 10 by the screw 20. Particularly, it is preferable in obtaining of the grip finger 100 having three or more V-shaped edges from the finger piece 101 which is developed as shown in FIG. 3.

The function of the thus configured microgripper will be described with reference to FIG. 1. When the motor 12 is powered on, the rotor shaft 12a of the motor 12 is rotated, this rotation is transmitted to the nut 10 via the screw shaft 11, and the nut 10 is moved in the nut accommodating portion 14c along the screw shaft 11 in the right direction in FIG. 1.

In accordance with this movement, the coupling portion 100g of the grip finger 100 is compulsively displaced by the same displacement amount in the same direction, a bending moment acts on the grip finger 100, the tip end portions 100a are bent in directions so as to be close to one another, and the tip end portions 100a are closed to grip the object.

Hereinafter, the magnifying displacement of the tip ends of the grip finger 100 will be described. When the ratio of the bending displacement X (hereinafter, referred to as the tip end displacement amount) in the opening and closing directions of the grip finger 100 to the slight translational displacement amount h of the coupling portion 100g of the grip finger 100 is indicated as a magnification ratio G=X/h, the tip end displacement amount X, the translational displacement amount h, and the magnification ratio G are indicated by the following expressions:

$X=L \sin \Theta \approx L\Theta,$ $h=L(1-\cos \Theta) \approx L(\Theta^2/2),$ $G=X/h=2/\Theta$ where
L=length of the edge portion 100k (m), and Θ=angle formed by the edge portions 100d and 100k (rad).

Specifically, when the translational displacement amount h of the grip finger 100 is 0 to 10° in the term of the angle Θ, the magnification ratio G is ∞ to 11.5. Namely, the tip end displacement amount X is magnified with respect to a slight translational displacement amount h. At this time, the bending displacement amount produced in the tip end portions can be easily magnified to several tens of times the pulling displacement amount of the coupling portion 100g.

By contrast, when the rotation of the motor 12 is reversed, this rotation causes the nut 10 via the screw shaft 11 to be translationally moved in the reverse direction. The translational displacement amount is transmitted in the same manner as described above to translationally move the coupling portion 100g of the grip finger 100, and the tip end portions 100a of the grip finger 100 cancel the gripping of the object.

Figure 7:
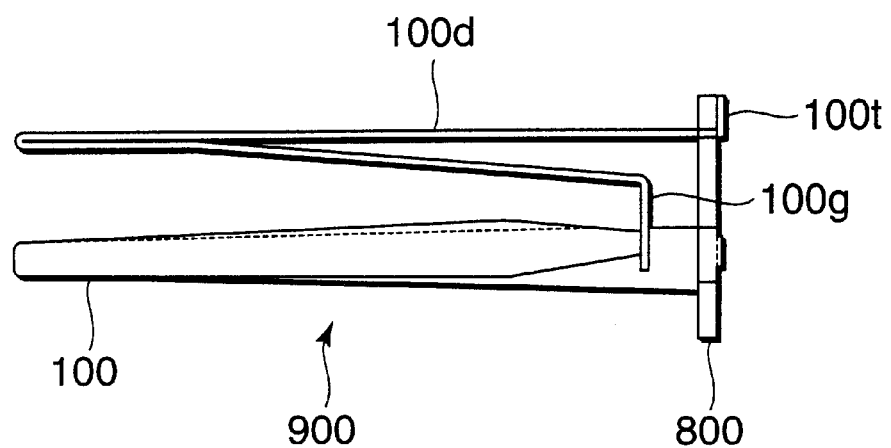
FIG. 7 is a front view showing a state where a grip finger of another embodiment of the invention is configured as a unit.
Figure 8:
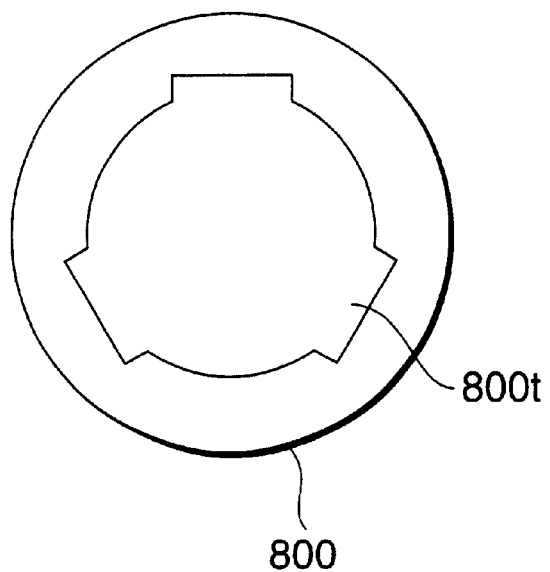
FIG. 8 is a plan view of a ring member used in the unit of the grip finger shown in FIG. 7.

Alternatively, three cutaways 800t which are substantially equal in width to the fixing claws 100t of the grip finger 100 may be disposed at regular intervals in the inner side of a ring member 800 that is a flat plate and having an annular shape as shown in FIG. 8, and the grip finger 100 may be formed as described above. As shown in FIG. 7, thereafter, the fixing claws loot of the grip finger 100 may be engagingly fixed to the cutaways 800t of the ring member 800 to configure the grip finger 100 as a unit 900.

When the grip finger 100 is configured as the unit 900, the forms of the edge portions 100d and the fixing claws 100t of the grip finger 100 are more stabilized as compared with the case where the grip finger 100 is singly configured, and hence the property of assembling to a microgripper is improved.

In the above embodiment, the method of producing the grip finger 100 having the three V-shaped edges has been described as an example of a displacement magnifying member which comprises plural V-shaped edges having a substantially V-like shape. The embodiment can be applied to a method of producing a grip finger having plural V-shaped edges. Particularly, a grip finger having three or more V-shaped edges can be accurately produced from the state of the developed finger piece 101 having a substantially Y-like shape as shown in FIG. 3. In a grip finger having four or more V-shaped edges, the edge portions 101a shown in FIG. 3 the number of which corresponds to that of the V-shaped edges are formed.

As described above, the first invention attains an effect that a displacement magnifying member for gripping an object can be easily produced.

In addition to the effect of the first invention, the second invention attains an effect that a fixing claw for fixing the displacement magnifying member to a microgripper can be easily produced.

In addition to the effects of the first and second inventions, the third invention attains an effect that, since a bending operation can be performed at the identification portion, the workability of the production of the displacement magnifying member is improved.

In addition to the effect of the second invention, the fourth invention attains an effect that a bending operation is easily performed at the coupling portion of the displacement magnifying member.

In addition to the effect of the second invention, the fifth invention attains an effect that, since the displacement magnifying member is integrated with the ring member, it is requested only to pressingly hold the ring member in the work of fixing the displacement magnifying member to a microgripper, whereby the property of assembling is greatly improved.

Since the end portion of the displacement magnifying member is fixed to the ring member, there is an effect that, in stock management of a large number of displacement magnifying members, the displacement magnifying members are hardly damaged in shape and the like.

INDUSTRIAL APPLICABILITY

As described above, the method of producing a microgripper according to the invention is suitable for producing a gripper comprising a gripping member having plural V-shaped edges.

We claim:

1. A method of producing a microgripper comprising:
    providing, as a substantially flat planar member, a coupling portion and a plurality of edge portions that extend from said coupling portion;
    forming a displacement magnifying member from at least two of said plurality of edge portions by bending said at least two of said edge portions into a V-shape by:
        inwardly bending, out of said plane in a first direction, said plurality of edge portions at a vicinity of said coupling portion;
        outwardly bending, in a second direction opposite to said first direction, said edge portions at about a center point thereof so that each of said edge portions forms a substantially V-shape comprised of two opposed edge portions, wherein for each edge portion, one of said opposed edge portions is connected to said coupling portion, and the other one of said opposed edge portions extends from said one of said opposed edge portions;
    providing a translational driving section having a moving portion housed in a case and translationally moved;
    connecting each of the other ones of said opposed edge portions to said case; and
    connecting said coupling portion to said moving portion of said translational driving section so that said coupling portion is pulled on the basis of translational movement, and so that displacement amounts of tip ends of said opposed edge portions are inwardly magnified more than an amount of the translational movement.

2. The method of producing a microgripper according to claim 1, further comprising a step of outwardly bending each of the other opposed end portions, of said displacement magnifying member, so as to obtain a fixing piece, and connecting said fixing piece to said case.

3. The method of producing a microgripper according to claim 1, wherein said edge portions have an identification portion for visually recognizing a place to be bent.

4. The method of producing a microgripper according to claim 2, wherein
    said coupling portion of said displacement magnifying member has a doughnut shape, and boundary portions between said coupling portion and said edge portions are smaller in width than are said edge portions.

5. The method of producing a microgripper according to claim 2, wherein
    said displacement magnifying member further comprises a ring member, and said method further comprises engagingly fixing said fixing pieces to a cutaway formed in an inner side of said ring member, and connecting said ring member to said case.

6. The method of producing a microgripper according to claim 1, wherein said outwardly bending step further comprises bending the edge portions so that opposed edge portions lie atop one another over a portion of their length so as to form said tip ends.

* * * * *